Patented Jan. 24, 1933

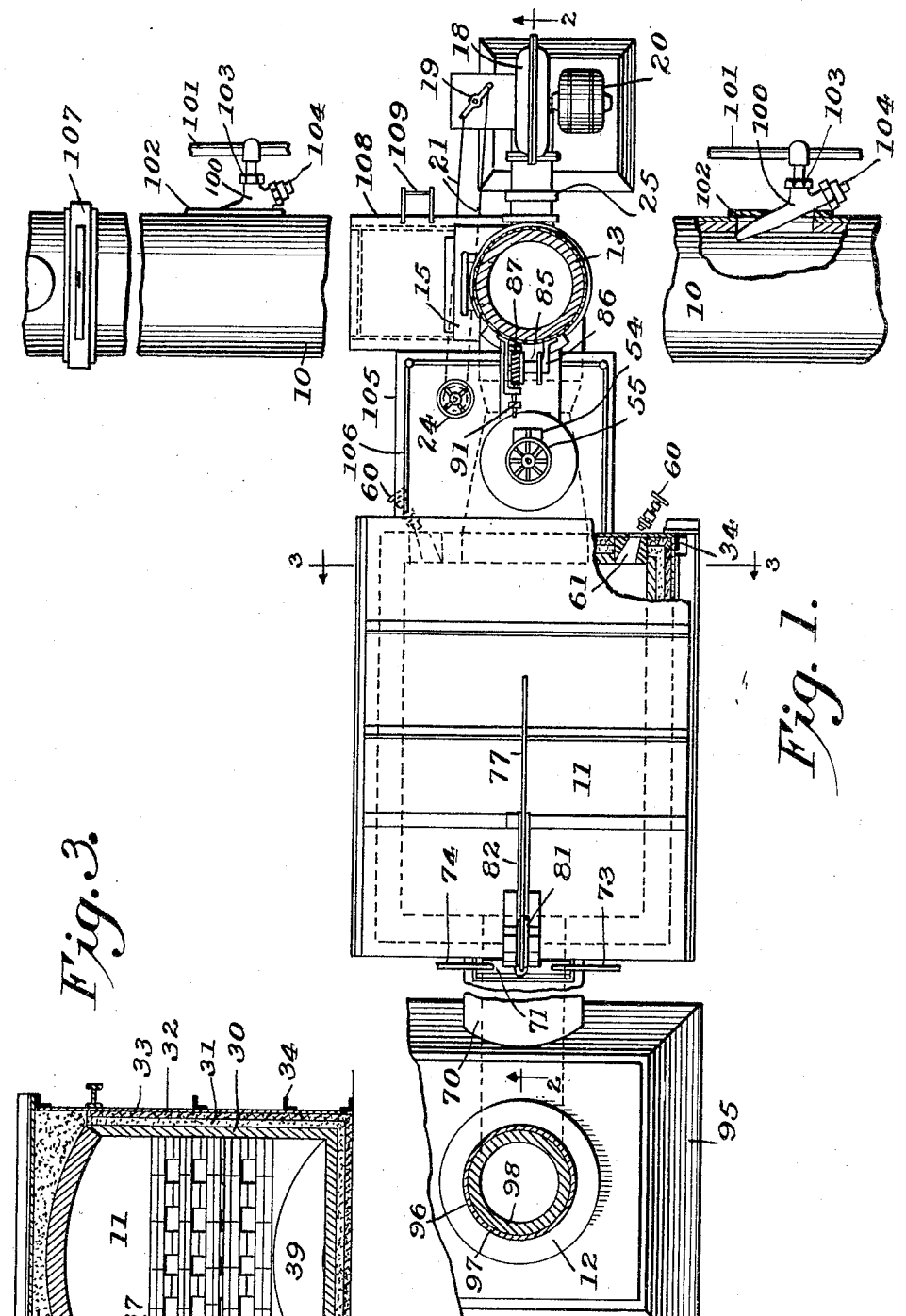
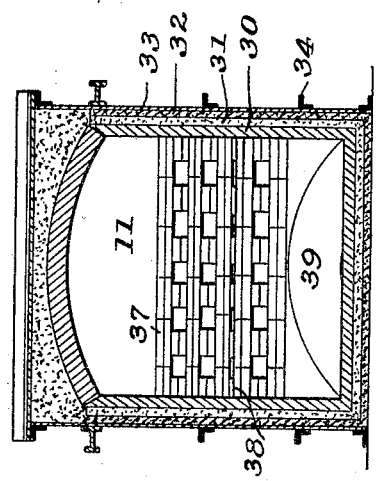

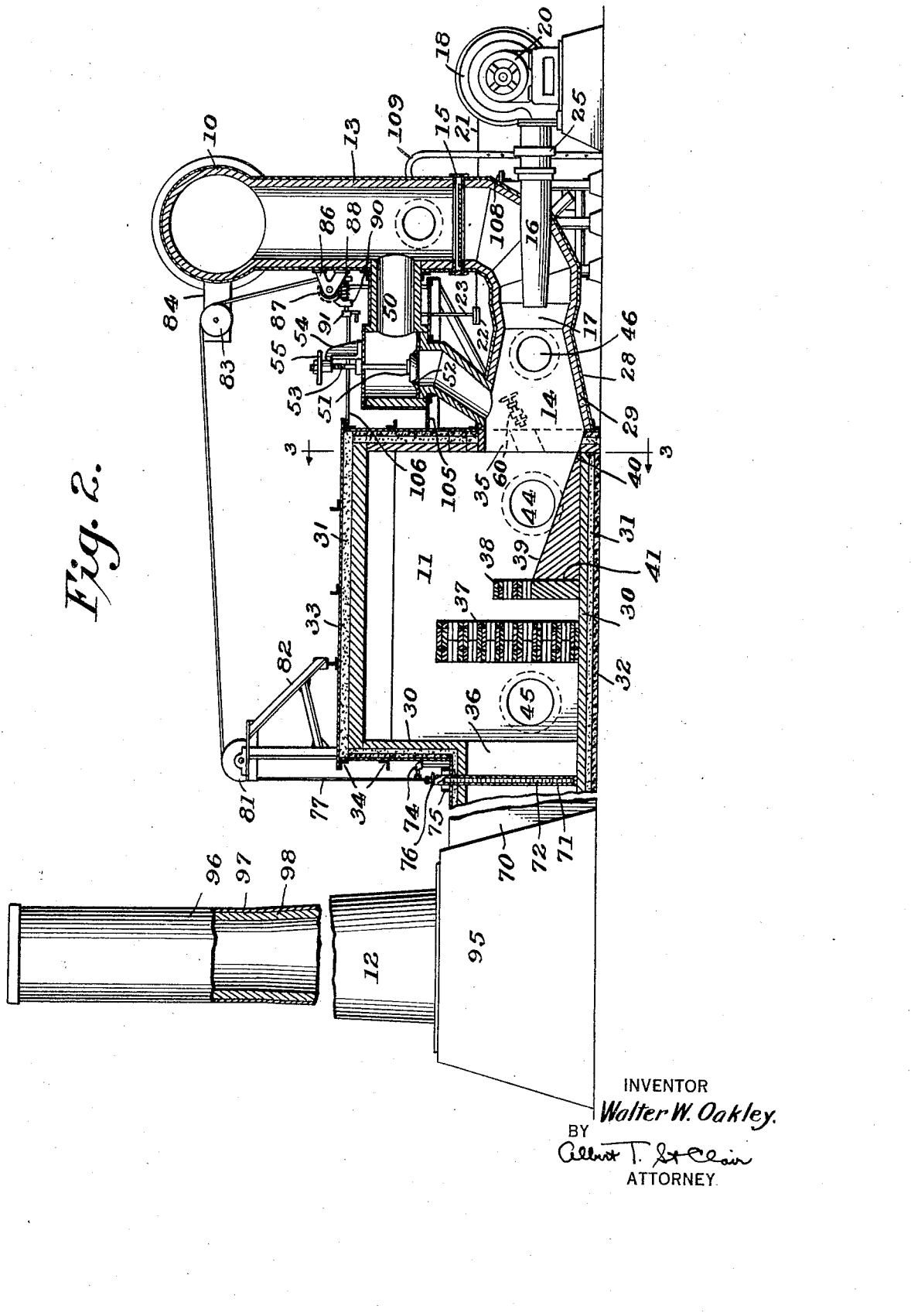

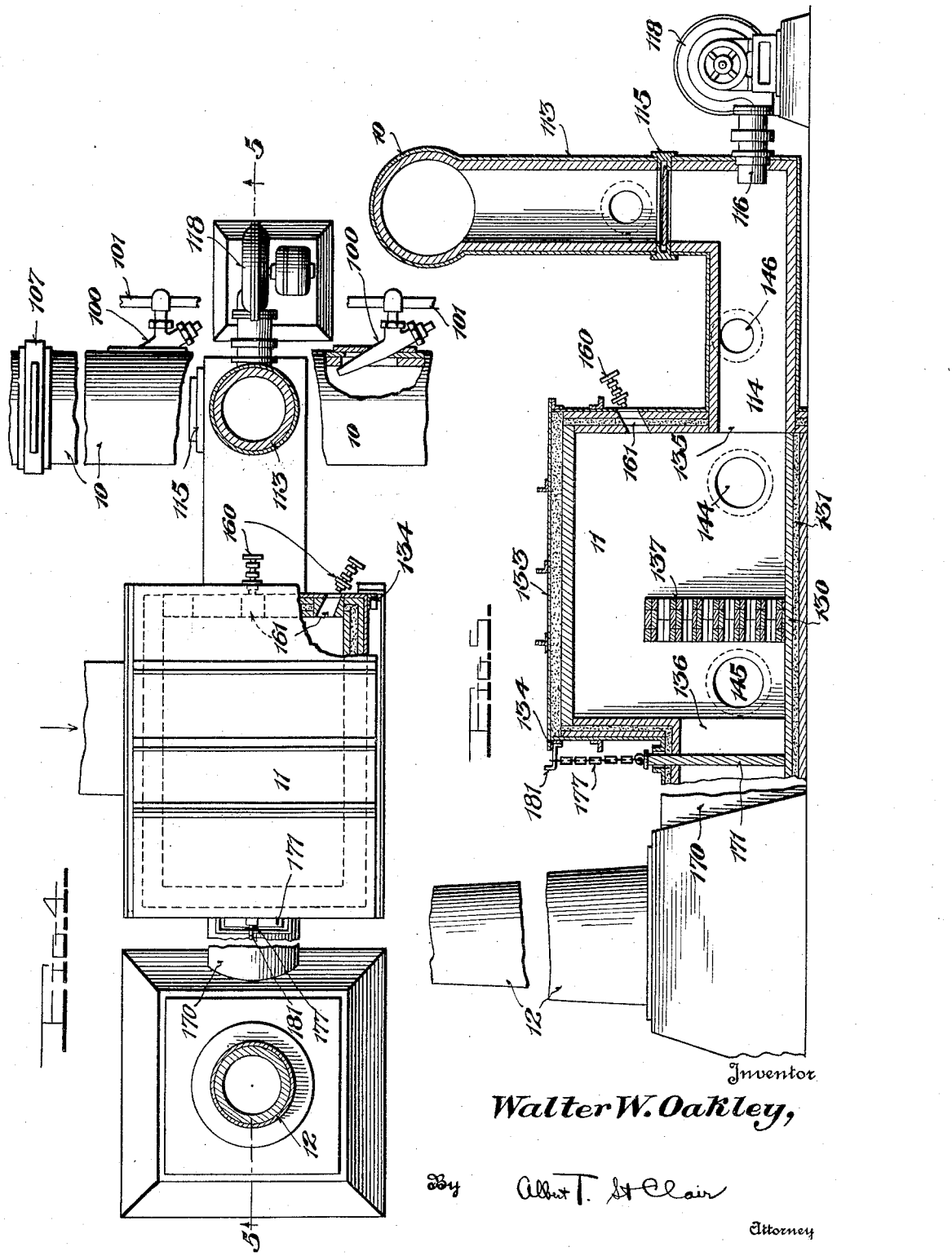

1,894,961

UNITED STATES PATENT OFFICE

WALTER W. OAKLEY, OF CORNING, NEW YORK

SOOT DISPOSAL

Application filed September 17, 1927. Serial No. 220,229.

This invention relates to the art of fuel burners and more specifically to a method of and apparatus for removing deposits of soot, particularly from gas producer lines and boiler tubes.

It has heretofore been customary to remove accumulations of soot by raking out or blowing out with steam, but both of these methods are objectionable, since raking out is difficult and expensive and still leaves the ultimate disposal of the soot to be provided for, and blowing out with steam discharges the soot into the atmosphere unburned with a consequent pollution of the surrounding territory.

By my present invention I blow the soot, granular and flaky combustibles, as well as tarry vapors, into a preheated incinerator and, preferably simultaneously therewith, introduce into said chamber a proper volume of air at a predetermined velocity and pressure, cause an intimate mixing of soot and air, and supply sufficient heat to effect combustion before the mixture reaches the top of the stack, and preferably before it reaches the stack.

It is therefore an object of this invention to provide a new and improved method of soot disposal.

It is another object of this invention to provide an apparatus for carrying out this method.

It is also an object of this invention to perform these operations without discharging the soot into the atmosphere unburned and without damaging the gas main.

It is an additional object of this invention to burn the soot exteriorly of the gas main.

It is another object of my invention to prevent the building up of excessive temperatures in the mains which are being cleaned out as a result of the burning out process.

It is a specific object of this invention to provide means for effecting a proper mixing of the soot and air to effect complete combustion.

With the above and other objects in view, which will be apparent as the description proceeds, I have set forth my invention in the following specification taken in connection with the accompanying drawings, in which:

Fig. 1 is a plan view of my improved apparatus, with the stack shown in section and with certain parts broken away for the sake of clearness;

Fig. 2 is a longitudinal sectional elevation of my apparatus, the sectional part being taken on the line 2—2 of Fig. 1;

Fig. 3 is a transverse section through the incinerator, taken on the line 3—3 of Figs. 1 and 2.

Fig. 4 is a plan view, and Fig. 5 is a longitudinal vertical section, on the line 5—5 of Fig. 4, showing an early form of applicant's invention, which invention is also embodied in an improved specific form in Figs. 1–3, in which figures certain improvements that are the invention of Royden A. Blunt, Patent Number 1,747,569 granted February 18, 1930 are also embodied.

My invention is particularly adapted for the removal of deposits from producer gas mains. In these there is a heavy accumulation of soot, which is of a loose, light and flaky nature, so that it is easily blown out into the atmosphere if any considerable pressure is applied to it. This soot is often accompanied with granular and flaky combustibles, as well as tarry vapors. This accumulation is so rapid that after operation for a week the mains are often filled with it to three-fourths of their capacity, thus impairing their effectiveness and making it necessary to remove this accumulation. I have discovered that this can be done, without discharging the soot into the atmosphere, and without damaging the line, by blowing the soot into a preheated incinerator in which the soot is mixed with a large volume of air, the temperature of the mixture is raised above the ignition temperature, and most of the soot is burned, any soot not consumed in the incinerator proper being completely burned before it reaches the top of the stack, so it will not be discharged into the atmosphere unburned.

My invention is also adapted for the removal, in a similar way, of deposits of soot, granular and flaky combustibles from boiler tubes.

Referring to the accompanying drawings,

I have illustrated therein the general arrangement of a producer gas main 10, an incinerator 11 and a stack 12 embodying my invention.

In the preferred form of my invention shown in Figs. 1-3, which will be described in detail first, the gas main 10 is connected with the incinerator 11 by a dust leg 13 and an inlet 14, which is shown herein as being Venturi-shaped, a damper 15 serving to prevent communication between the dust leg and the Venturi inlet when desired, but, when the damper 15 is opened, any soot that has been collected in the dust leg 13 will drop by gravity into the inlet 14. To move this soot into the incinerator 11, there is provided a blast nozzle 16 which projects into the contracted throat 17 of the inlet 14, the blast nozzle being supplied with air by a fan blower 18 whose air intake is controlled by a quick acting flapper or butterfly type of damper 19. The blower 18 may be of any suitable type, and is operated by a motor 20, preferably of constant speed. Although its size will depend on the size of the particular installation, I have found that a fan blower which delivers 11,000 cubic feet of air per minute at a pressure of 6 inches of water is a satisfactory size.

Damper 19 is operated by a double cable 21 which passes over a pulley 22, mounted in a bracket 23 which depends from an operating platform to be described later, and thence upwardly through said platform to a hand wheel 24.

An additional damper 25 is preferably inserted in the blast nozzle 16 between its end and the fan blower 18. This is opened before the burning out operation is started, and is closed after same is finished to prevent any appreciable volume of heat or gases from passing back to the fan blower. This damper does not need to be adjusted during the burning out operation.

The gas main 10, dust leg 13, and Venturi-shaped inlet 14 may be of any desired construction, such as a sheet steel shell 28, lined with fire brick 29.

The incinerator 11 is a fire proof chamber interposed in the line between the main 10 and the stack 12, and may take a variety of shapes, but is shown as substantially rectangular in the present embodiment of my invention. It is preferably built of first grade fire brick 30, that may be surrounded with an insulating material 31, such as sil-o-cel, the latter being provided with any suitable covering, such as the sand grog 32 and steel shell 33. I find it preferable, however, to omit the layer of sand grog on the top wall of the incinerator and substitute a greater thickness of sil-o-cel therefor, and in some instances it is sufficient to increase the thickness of the fire brick wall and omit the sil-o-cel, sand grog and steel shell. The incinerator may be provided with angle iron supports 34, or any customary strengthening means. At its end nearest the gas main, the incinerator is provided with a soot and air inlet 35, and at its end nearest the stack 12 it has an outlet 36 for the burnt gases and burning mixture of soot and air. To delay the passage of the soot and air through the incinerator and facilitate their mixture and combustion therein, I prefer to form a checker wall 37 of any suitable type intermediate of the ends of the incinerator. Between wall 37 and the inlet 35 I prefer to provide a secondary checker wall 38 which, like the wall 37, is of commercial heat resisting brick.

Other means, such as a combustion cone segment 39, may also be used to facilitate the proper mixture of the incoming soot and air. As shown in Figs. 2 and 3, this is a convex cone segment with an apex 40 adjacent the inlet openings 35 and a base 41 formed by the lower part of the secondary wall 38. The surface of cone segment 39 is such that it facilitates the intimate mixing of the incoming soot and air and gives a maximum surface combustion.

The incinerator 11 is preferably provided with doors 44 and 45, the former in front and the latter behind the checker walls 37 and 38. These are not only useful when it is necessary to make repairs, but permit an easy removal of deposits of dust and other non-combustible materials. The inlet chamber 14 is also provided with a door 46 and the latter, as well as door 44, is useful for a purpose to be described later.

To preheat the incinerator 11 the dust leg 13 is preferably provided with a by-pass 50 through which the producer gas is conducted into the pipe 14, and thence into the incinerator 11 through the inlet opening 35. A valve 51, which cooperates with a valve seat 52, is interposed in the by-pass 50 to control the discharge of the producer gas, the valve 51 being attached to the end of a screw threaded shaft 53 supported in a bearing bracket 54, and having an operating handle 55 for its convenient manipulation.

Inasmuch as the supply of producer gas is cut off during the burning out operation, other means for heating the incinerator during this time are necessary, and for this purpose I prefer to use a pair of oil burners 60 of any well known type, one of which is mounted on each side of the Venturi inlet 14. As shown in Fig. 1, these burners are preferably mounted in proximity to openings 61 in the front wall of the incinerator 11 and are arranged to direct the flames into the incinerator at opposite angles, thus facilitating combustion forward of the checker wall 38 and around the combustion cone. If desired, a larger number of oil burners may be used. Furthermore the preheating may be effected by the use of oil burners instead of producer gas, and in this case one or more of the oil burners will be used to preheat the checker walls.

As best shown in Fig. 2, the incinerator 11 is connected with a stack 12 through a stack flue 70, a stack damper 71 being introduced into the flue 70 to form a cut off therein. This damper may be cooled in any desired manner, and this may conveniently be done by water 72, which is circulated therethrough from inlet and outlet pipes 73 and 74, respectively. The damper may be mounted and operated in various ways, but is herein shown as being guided by bearing slot 75 in the top of the stack flue 70 and extending therethrough, terminating in an operating head 76 to which is attached a cable 77 for controlling its operation from a distance. Table 77 passes upwardly over a sheave 81 carried in a bracket 82 mounted on top of the incinerator 11, thence over a second sheave 83 carried in a bracket 84 on the gas main 10, and finally around a drum 85 which is rotatably mounted in bearing brackets 86 carried by the dust leg 13. Drum 85 is provided with a worm wheel 87 that cooperates with a worm 88, carried by a bearing 90 extending from one of the brackets 86, the worm and worm wheel, and consequently the drum 85, being operated by a crank 91, mounted on the end of worm 88.

The stack 12 may be of any desired type, but is herein shown as being provided with a base 95 and vertical pipe 96. As shown in Fig. 1, the vertical pipe 96 consists of a steel shell 97, provided with a fire brick lining 98, and the base 95 is preferably formed of similar materials, although the exact construction of the pipe and base forms no part of the present invention. If desired, the pipe and base may be insulated in any well known manner.

At suitable points in the gas main, as, for example, every few feet, I prefer to arrange steam nozzles or blow pipes 100, which are supplied with steam from pipes 101. These nozzles form a tight connection with the gas main by means of sealing plates 102, and are provided with adjusting valves 103 and also with clean out plugs 104 to permit the removal of scale or other stoppage from the nozzles. These nozzles may be either portable or stationary.

An operating platform 105, provided with a guard rail 106, may be mounted at any convenient location, as between the dust leg 13 and the incinerator 11, at about the height of the producer gas valve 51.

A platform 108 gives easy access to the damper 15, and any convenient means, such as a ladder 109, may be provided for reaching the platforms 108 and 105.

*Operation*

Some time, for example, eighteen hours, prior to the regular period for cleaning out the gas main, a small fire is kindled in the front end of the incinerator 11 and the water cooled damper 71, connecting the incinerator 11 to the furnace stack 12, is raised slightly. When the fire is burning briskly, if the preheating is to be done by the producer gas, the latter is admitted through the gas valve 51, which is opened wide as rapidly as safety permits. In this way, or by the oil burners 60, the temperature is brought up gradually to about 2200° to 2400° F. When it is desired to start burning out the gas main 10 the oil burners 60 are used to maintain the temperature of the incinerator, and dampers 107, which are provided between the producer plant and main 10, are closed to prevent communication between these parts during the burning out. Valve 51 is then closed, damper 71 is opened wide, and damper 15, between the incinerator 11 and the main 10, as well as damper 25, in blast nozzle 16, are opened. This gives a direct connection from the gas main 10 to the furnace stack 12, so that the latter will pull all gases out of the gas distributing system as soon as vents are given through doors (not shown) at the far ends of all gas lines, and any carbon soot, fine particles of coke, dust or other foreign matter must pass through the incinerator before passing out of the stack. At this period the incinerator 11 would cool off rapidly except for the additional heat supplied by the oil burners 60. The fan blower 18 is now started to supply the necessary air, and this is passed through the large Venturi-shaped inlet 14 to the incinerator 11. This increases and assists the stack 12 in maintaining a draft or vacuum upon the gas main and blows the soot toward the incinerator. The top of the stack 12 is watched closely by the operator, who opens the damper 19 on the fan blower 18 if the stack smudges, or closes it if the stack runs clear, a very slight smudge being the proper condition wanted. A very clear stack indicates that excess air is passing through the incinerator, cooling it unduly. With the apparatus thus adjusted the soot is moved from the gas main 10 into the dust leg 13 that connects the main to the incinerator 11, and this is brought about through the steam nozzles 100 which admit steam only to the formations of soot lying in front of them. As the line is under suction, it is permissible to open a door so that a portable blow pipe can be inserted to remove any soot which would not readily be reached with stationary nozzles. If the soot is moved through the line at a fairly constant rate, the incinerator can be set to consume it perfectly, preferably therein, and certainly before it emerges from the top of the stack, but if it varies slightly the operator can take care of this by admitting more or less air as the case may warrant.

When the clearing out operation is completed, or when the main is clean, it is only necessary to shut off the fan and oil burners 60, close dampers 15 and 25, shut off the steam nozzles 100 and supply the gas main with producer gas as before. Dampers 19 and 71 may be left slightly open. While the mains are being cleaned out the producer gas is shut off from the furnaces and other apparatus which are normally heated by it, and the oil or gas burners (not shown) with which this apparatus is usually provided are lighted to maintain their temperature.

When no soot is being sent to the incinerator 11, damper 19 must be closed immediately to conserve heat. Likewise, if for any reason the operation is held up for a considerable time, for example, more than a couple of minutes, damper 71 should be lowered so as to leave an opening, which is just sufficient to take care of the oil fire supplied by the burners 60.

If for any reason it is not feasible to blow some portions of the gas main clean, and they can be dumped, the accumulated soot may be shoveled through openings 44 or 46 while the incinerator is still hot, and these deposits will be consumed before they reach the top of the stack.

It will be obvious from the above description and statement of operation that the essential adjustments can all be made from the operating platform 105, inasmuch as the controls for the gas valve 51, the flapper damper 19 and the water-cooled stack damper 71 are arranged here. By placing the switch for the motor 20 at this point the operation of the fan blower 18 can also be controlled from here.

For the proper operation of my method it is essential that there be a proper mixing of the incoming soot and air, so as to produce a combustible mixture. This is partially controlled by the venturi action of blast nozzle 16 and the contracted throat 17 of the inlet 14, and partly by any suitable mixing means within the incinerator 11. The latter may take various forms but, as explained above, is shown herein as consisting of the checker walls 37 and 38 and the combustion cone segment 39. It is also essential that the temperature in the incinerator 11 be high enough to secure complete combustion of the soot. This is made possible by the preheating of the incinerator, coupled with the heat supplied to it during the burning out operation.

Without in any way limiting myself thereto, I have found that a suitable incinerator for a plant consuming 300,000 cubic feet of hot producer gas per hour is one having outside dimensions of 14 feet long, 9 feet 9 inches wide and 10 feet 10 inches high. I have also found that preheating for about 18 hours before the burning out operation is to be started, and to a temperature of about 2200° to 2400° F., is satisfactory, in conjunction with the use of oil burners that maintain this temperature in the incinerator during the burning out operation. Likewise pressures of about 6 inches of water produced by a fan delivering about 11,000 cubic feet of air per minute, are suitable to secure the necessary velocities, coupled with the stack draft, to induce the requisite vacuum in the gas main 10 to draw the soot into the incinerator 11 at the proper rate to effect complete combustion before it reaches the top of the stack 12 and to prevent the pressures from being transmitted back into the gas main. Using the above temperatures and pressures, I have found it possible to completely burn out producer gas mains up to 240 feet in length, and containing approximately 4250 cubic feet of soot, in two hours.

Referring now to the form of my invention shown in Figs. 4 and 5, the gas main 10 is connected with the incinerator 11 by a dust leg 113 and an inlet 114, a damper 115 being provided to prevent communication between these last mentioned portions when desired. When the damper 115 is opened, however, producer gas or soot, if present on the opposite side of the damper, is free to pass into the inlet 114 and thence into the incinerator 11. To move the soot from the inlet 114 into the incinerator I provide a blast nozzle 116 which projects into the inlet 114 and is supplied with air by a fan blower 118 of any suitable size. The gas main, dust leg and inlet may be of any desired construction.

The incinerator 11 is a fireproof chamber interposed between the main 10 and the stack 12, and may be made of various shapes, but is shown herein as being substantially rectangular. It is preferably built of fire-brick 130 and surrounded with insulating material 131, such as sil-o-cel, with any suitable covering material such as the steel shell 133. Any suitable strengthening means, such as the angle iron supports 134 may be provided. At its end nearest the gas main, the incinerator has a soot and air inlet 135, and at its end nearest the stack 12 it has an outlet 136 for the burnt gases and burning mixture of soot and air. To delay the passage of the soot and air through the incinerator and facilitate their mixture and combustion there is provided a checker wall 137 of any suitable type, and made of commercial heat resisting brick, intermediate of the ends of the incinerator. The incinerator is also provided with any suitable doors 144 and 145, and the inlet chamber 114 is preferably provided with a door 146.

The incinerator 11 may be preheated in various ways. As shown in these figures this may be done by producer gas supplied from the gas main 10 through the dust leg 113 and inlet 114 when the damper 115 is opened. During the burning-out operation, however, the supply of producer gas is cut off by damper 107, hence other means are necessary in order to heat the incinerator during this time. For this purpose any suitable number of oil burners 160 of any well known type, two being shown herein, are preferably mounted in openings 161 in the front wall of the incinerator. These burners direct the flames into the incinerator and facilitate combustion forward of the checker wall 137. If desired, these oil burners may be used for the preheating.

As shown in Fig. 5, the incinerator 11 is connected with the stack 12 through a stack flue 170, provided with any suitable stack damper 171. The damper may be operated in any desired way, as by a chain 177 adapted to engage a hook 181.

The stack 12 is of any desired type, for example as explained above in connection with Figs. 1-3.

The gas main 10 is provided with any desired number of portable or stationary steam nozzles or blow pipes 100 of any desired type, and these are supplied with steam from pipes 101.

*Operation*

The form of my invention illustrated in Figs. 4 and 5 is operated in substantially the same manner as already described for the form shown in Figs. 1-3, except that preheating is done by producer gas supplied through the inlet 114 or by oil burners 160; the operation is not controlled from a single station; the mixture of soot and air is effected without the aid of a venturi action, without a combustion cone-segment and without a second checker wall; and the blower is not provided with a flapper valve, the proportion of soot and air being controlled in other ways, as by the rate the soot is moved through the line with the aid of the steam nozzles or blow pipes 100.

The invention set forth in the present application, while of general application, is especially adapted for use in plants having old gas mains which would not stand the temperatures developed in them if the burning out actually took place in the mains themselves at the rate indicated above.

It will therefore be apparent that I have invented a new and useful method of eliminating soot from producer gas mains and for disposing of it, and a new apparatus for conveniently carrying out said method, without burning the soot in the main and without blowing it out into the atmosphere unburned.

While I have herein set forth the preferred embodiment of my invention and one modification thereof, I do not desire to be limited thereto except as indicated in the following claims, since it will be obvious that it may be modified in various ways, such as the use of incinerators of different shape, other methods of introducing the blowing air, the substitution of air for steam to remove the soot from the gas main, and the use of other methods of promoting an intimate mixture between the soot and the air prior to combustion. Furthermore, my invention may be used in combination with other methods of soot removal when desired.

No claims are made herein to the specific features shown in Figs. 1-3 which do not appear in Figs. 4 and 5, to wit, the special combustion cone segment, the venturi action in connection with the intake of air and soot, the quick-acting flapper or butterfly type of damper 19, the water cooled damper, the centralized control, or the introduction of the producer gas into the incinerator through a by-pass in the main passage between the gas main and the incinerator, and the particular valve mechanism for controlling the introduction of the producer gas, inasmuch as these features were not invented by me.

I claim:

1. Apparatus for removing soot from gas mains and disposing of same which includes the combination of a gas main, an incinerator, a connection between the main and the incinerator, means for expelling the soot from the gas main, means for introducing the soot and a large volume of air into the incinerator, and means for heating the incinerator to promote the combustion of the soot and air.

2. Apparatus for removing soot from gas mains and disposing of same which includes the combination of a gas main, an incinerator, a connection between the main and the incinerator, steam nozzles for expelling the soot from the gas main, a fan blower for introducing the soot and a large volume of air into the incinerator, and means for heating the incinerator to promote the combustion of the soot and air.

3. Apparatus for removing soot from gas mains and disposing of same which includes the combination of a gas main, an incinerator, a connection between the main and the incinerator, means for preheating the incinerator, means for expelling the soot from the gas main, means for introducing the soot and a large volume of air into the incinerator, and other means for heating the incinerator to promote the combustion of the soot and air.

4. Apparatus for removing soot from gas mains and disposing of same which includes the combination of a gas main, an incinerator, a connection between the main and the incinerator, means for preheating the incinerator, steam nozzles for expelling the soot from the gas main, a fan blower for introducing the soot and a large volume of air into the incinerator, and other means for heating the incinerator to promote the combustion of the soot and air.

5. In apparatus for removing soot from gas mains and disposing of same, the combination of a gas main, an incinerator, means for conveying producer gas from the main to the incinerator for preheating it, and means for preventing the passage of further producer gas to the incinerator without preventing the passage of soot thereinto.

6. In apparatus for removing soot from gas mains and disposing of same, the combination of an incinerator, means for introducing the soot and a large volume of air into the incinerator, and means for producing an intimate mixture between the soot and the air.

7. Apparatus for removing soot from gas mains and disposing of same which includes the combination of a gas main, an incinerator, a connection between the main and the incinerator, means for expelling the soot from the gas main, means for introducing the soot and a large volume of air into the incinerator, means for producing an intimate mixture between the soot and the air, and means for heating the incinerator to promote the combustion of the soot and air.

8. In apparatus for removing soot from gas mains and disposing of same, the combination of a gas main, an incinerator, a single means for continuously propelling the soot which has collected in the gas main into the incinerator and for introducing a large volume of air thereinto, and a checker brick construction for storing up heat, slowing the passage of soot and air through the incinerator and facilitating their mixing and ignition.

9. In apparatus for eliminating soot, the combination of a gas main, from which soot is to be removed, an incinerator, means for preheating the incinerator, checker brick for absorbing the heat and giving it out at a later time, a single means for continuously introducing soot and air into the incinerator, and means for simultaneously heating said soot and air to complete its combustion.

10. Apparatus for disposing of soot, which comprises a producer gas main, a dust leg, means for moving the soot from the gas main into the dust leg, an auxiliary furnace, means for heating the furnace, and means adjacent to the dust leg for propelling the soot into the auxiliary furnace and putting it in suspension in a large volume of air.

WALTER W. OAKLEY.